US007526454B2

(12) United States Patent
Lau et al.

(10) Patent No.: US 7,526,454 B2
(45) Date of Patent: Apr. 28, 2009

(54) METHOD AND SYSTEM FOR CONVEYING FUNDS TO POSTAGE METERS

(75) Inventors: Mariano R. Lau, Ossining, NY (US); Ralph G. Mezzoni, Derby, CT (US); Surya R. Sagi, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 589 days.

(21) Appl. No.: 11/026,789

(22) Filed: Dec. 31, 2004

(65) Prior Publication Data

US 2006/0149690 A1 Jul. 6, 2006

(51) Int. Cl.
*G07B 17/02* (2006.01)
*G07B 17/00* (2006.01)
*G06Q 10/00* (2006.01)
*G06F 17/00* (2006.01)

(52) U.S. Cl. ........................ 705/403; 705/401; 705/410

(58) Field of Classification Search ................ 705/403, 705/60–62, 401–411
See application file for complete search history.

(56) References Cited

U.S. PATENT DOCUMENTS 4,812,992 A * 3/1989 Storace et al. .............. 705/403
4,853,864 A * 8/1989 Hart et al. ................... 705/403
4,864,506 A * 9/1989 Storace ....................... 705/403
4,949,272 A * 8/1990 Vanourek et al. ............ 705/410
5,309,363 A * 5/1994 Graves et al. .............. 705/403
5,729,460 A * 3/1998 Plett et al. .................. 705/403
6,853,990 B1 * 2/2005 Thiel .......................... 705/401
2003/0055794 A1 * 3/2003 Johnson et al. ............. 705/403

OTHER PUBLICATIONS

Powell, et al., Featured Product: Mailing Machines, Office Solutions vol. 17 No. 12, Dec. 2000, pp. 42-45, Dialog copy.*
Crew, et al., Emerging Competition in Postal and Delivery Services, 1999, Kluwer Academic Publishers pp. 281-307.*

* cited by examiner

*Primary Examiner*—John W Hayes
*Assistant Examiner*—Daniel P Vetter
(74) *Attorney, Agent, or Firm*—Michael J. Cummings; Steven J. Shapiro; Angelo N. Chaclas

(57) ABSTRACT

In a postage meter capable of making a request to refill automatically when postage funds drop below a threshold value, date-based rules are used to disable the refilling request if the request is made before an idle period. In order to avoid having unused funds sit unused during the idle period, thereby losing the time-value of money, refilling request can be made after the end of the idle period instead. The date-based rules can be set by a scheduler implemented in the postage meter. Alternatively, the scheduler is implemented in a funds manager device that oversees the refilling in a group of postage meters in a large mail production facility. Furthermore, the scheduler takes into consideration funds that can be shared by two or more postage meters in the same facility.

15 Claims, 6 Drawing Sheets

METHOD AND SYSTEM FOR CONVEYING FUNDS TO POSTAGE METERS

TECHNICAL FIELD

The present invention relates generally to management of postal funds in connection with postage metering devices.

BACKGROUND OF THE INVENTION

As shown in FIG. 1, a postage meter 1 may comprise a user interface 10, a control logic unit 20, an input/output communication logic unit 30, a PSD 40, a gatekeeper 50 and a printing mechanism 60. The user interface 10 allows a customer to specify the postage amount of the indicium to be printed. The control logic unit 20, upon receiving a signal from the user interface 10, notifies a PSD 40 of the specified postage amount. The PSD 40 checks to see whether the funds stored therein are sufficient to pay for the postage. If so, the PSD 40 sends a signal indicative of the indicium to the gatekeeper 50. When the user activates the postage meter 1 with a mailpiece on which the indicium is to be printed, a trip signal 23, via the control logic unit 20, causes the gatekeeper 50 to transfer the postage amount from the PSD 40 to the printing mechanism 60. Subsequently the requested indicium is printed. Whereas the PSD 40 keeps track of the funds in a fund keeper 42 stored in the postage meter 1 and authorizes a portion of the stored funds to be used for the postage indicium, the most important function of the gatekeeper 50 is to maintain a secure connection between the PSD 40 and the printing mechanism 60.

When the funds level in the postage meter 1 is low, the postage meter can request a transfer of funds from the vault 82 and data center 80. The fund transfer and the refill request are indicated by a two-way arrow 35. With the input/output communication logic unit 30, a customer uses the interface 10 to request the transfer of funds from the data center 80. Alternatively, the postage meter 1 can be programmed to make such a request automatically when the fund level is low.

It should be noted that the vault 82 in the data center 80 is in fact an accounting system for keeping track of the funds transferred to each postage meter. When the funds in the data center are exhausted, the data center may request a fund transfer from an account in a bank 90. When a customer has prepaid a large amount of money in order to use one or more postage meters, it is possible that some of the prepaid amount is deposited in an interest-earning account in the bank 90 or the like when that amount is not transferred to the postage meters.

SUMMARY OF THE INVENTION

Some postage meters are configured to make a request for refills automatically when postage funds drop below a threshold value. In order to avoid having unused funds lose the time-value of money, the automatic refill feature is disabled, or a warning is produced, when the automatic refill is occurring just before an idle period, such as a weekend, a holiday or other scheduled work stopping period. The disabling of the automatic refill feature is based on date-based rules. These date-based rules can also be used to generate a message to be displayed during manual meter refilling, informing the operator that an idle period is forthcoming and requesting confirmation that the transaction be fulfilled despite the arrival of the idle period.

In a large mail production facility where hundreds of thousands of mail pieces are processed daily, it is possible to provide a central funds manager device to oversee operations of all the postage meters at the facility. In such an environment, individual postage meters can make a request for a funds transfer through the central funds manager device. The refill request can be blocked by the central funds manager device based on the date-based rules.

Based on the usage of funds in the postage meters, the maximum funds amount for each postage meter can be configured. With a central funds manager device, it is possible to replenish a requesting postage meter with a replenishment amount smaller than the maximum amount, so that the remaining funds can be distributed to other meters based on the estimated needs by the other meters.

It is possible to configure a postage meter such that, when the postage funds drop below the threshold value, the meter is able to determine the funds consumption of the postage meter until the arrival of next idle period. If the remaining funds are sufficient to cover the determined funds consumption, the meter will refrain from requesting a transfer of funds until after the end of idle period.

DETAILED DESCRIPTION OF THE INVENTION

In a large mail production facility where hundreds of thousands of mail pieces are processed on inserter machines daily, a large amount of funds are automatically transferred to refill the postage meters when the funds in the postage meters drop below a threshold value. If a large amount of funds sit unused during holidays and weekends, a substantially large amount of time-value of money can be lost. Thus, it is advantageous to use a scheduler feature to disable the automatic refill feature of the postage meters based on certain date-base rules. With such a scheduler feature, the automatic refill features are allowed to function in normal operations. However, when the fund drops below the threshold before a known idle period, the automatic refill features are disabled until the idle period is substantially over. Alternatively, before or after the automatic refill features are disabled, a message notifies the operator of such disabling so as to allow the operator to override the date-based rule if necessary. For example, if the fund drops below the threshold value at the end of the last Friday shift but extra work shifts have been scheduled for Friday evening or the following weekend, the operator may override the date-based rules. Likewise, during manual meter refilling, the date-based rule is used to inform the operator of the approaching idle period so as to allow the operator to decide whether to refill the meters. Thus, the postage meter, according to the present invention, has a mechanism for avoiding having unused funds sit idly during an idle period.

Figure 1:
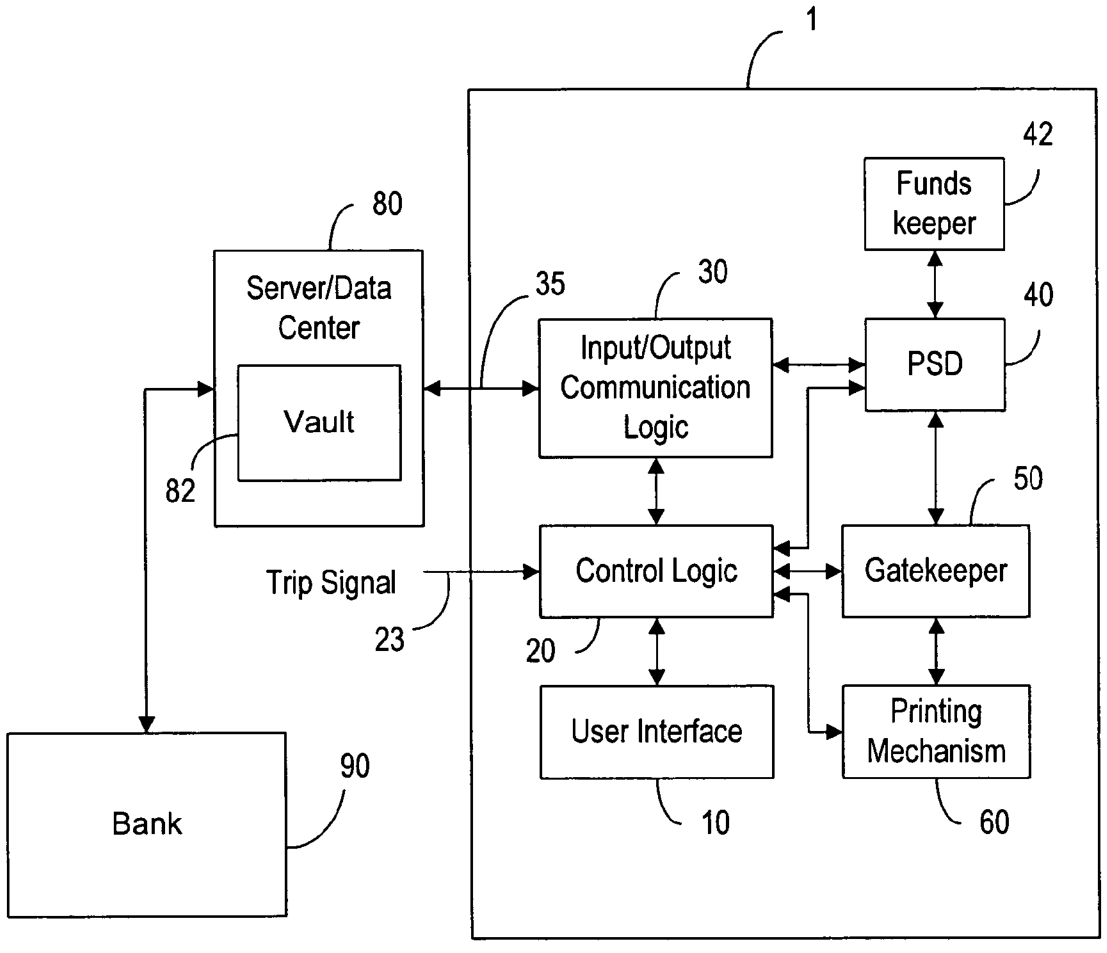
FIG. 1 is a block diagram showing a postage meter connected to a Data Center for transferring funds therefrom.
Figure 2:
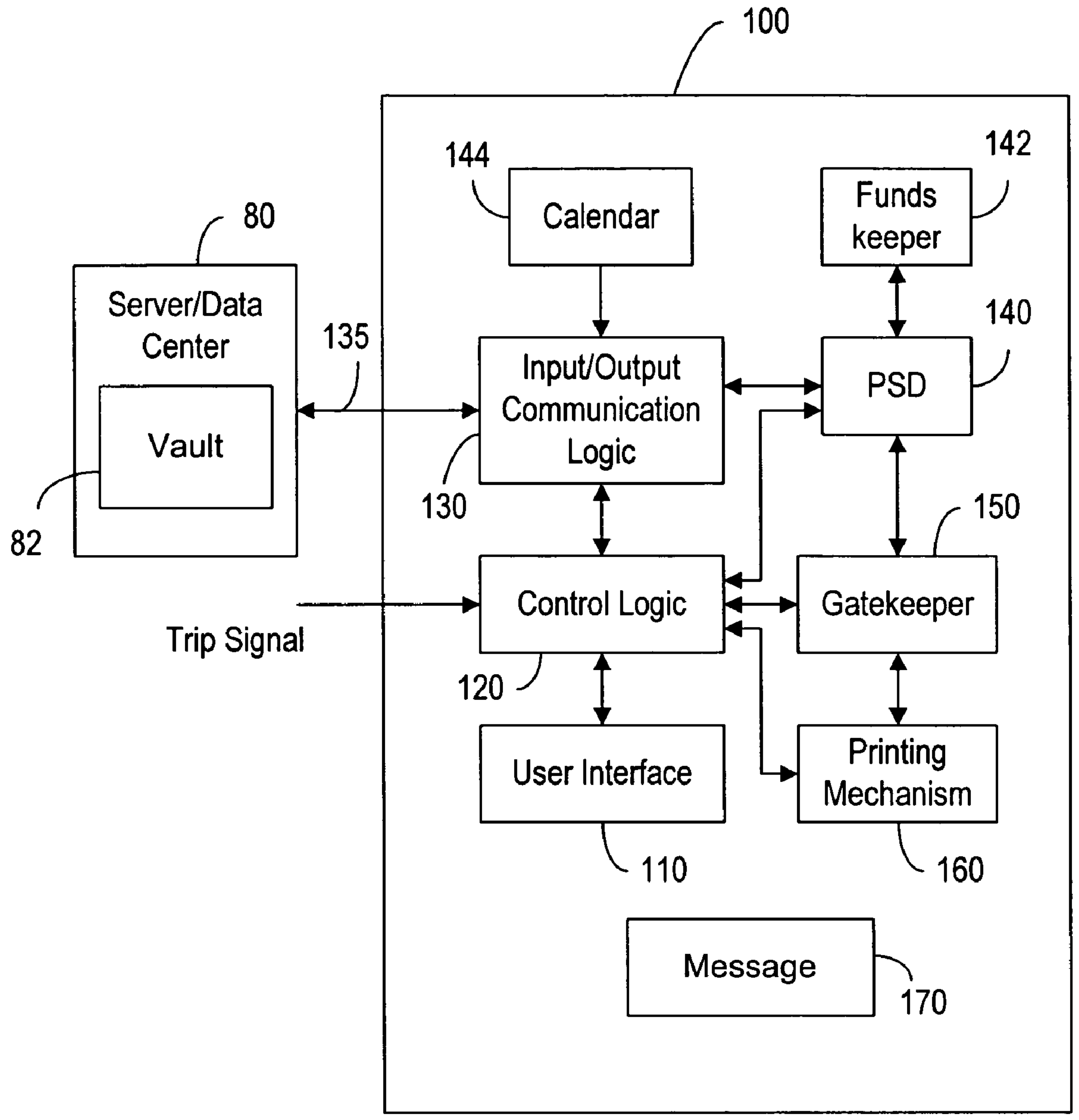
FIG. 2 is a block diagram showing a postage meter connected to the Data Center for transferring funds therefrom to the postage meter.

Typically, the postage meter 100, according to the present invention, is used to print postage indicia to be used on mail pieces. Printing indicia upon request is a normal function of the meter 100. As shown in FIG. 2, the postage meter 100 comprises a user interface 110, a control logic unit 120, an input/output communication logic unit 130, a postal secure device (PSD) 140, a gatekeeper 150 and a printing mechanism 160. The postage meter 100 can be linked to a data center 80 for requesting a transfer of funds when the funds level in funds keeper 142 is below a predetermined level. This automatic transferring of funds to the meter 100 can be carried out via the input/output communication logic unit 130. The predetermined level can be adjusted to reflect the funds consumption of a meter. The funds transfer and the funds transfer request are indicated by a two-way arrow 135. In addition, the postage meter 100 has a calendar 144 that is used as a date-based rule scheduler, designed to contain a plurality of possible idle periods such as weekends, holidays and other scheduled work stoppage periods. The idle periods are those time periods when the postage meter 100 is not likely used. The calendar 144 can be a software program, for example, that generates the dates of a year for years or decades. In addition, the software program is able to designate which dates of a particular year are the idle dates in order to set up the date-based rules. However, the date-based rules can be adjusted by the user to conform with the holidays of the country or region in which the facility is located. It is possible that the date-based rules be adjusted to reflect the need of the user.

In the embodiment as shown in FIG. 2, the meter 100 does not always automatically request a refill even when the PSD 140 finds out the fund amount in the fund keeper 142 is low. Whether the request is carried out is determined based on the date-based rules set forth in the calendar 144. More particularly, the postage meter 100 is able to determine the time period from the time the funds drop below the predetermined level (the threshold level) and the beginning of the forthcoming idle period, and the funds consumption of the postage meter for that period. If the remaining funds in the funds keeper are more than sufficient to cover the funds consumption for the period, the refill request can be made after the end of the forthcoming idle period. For example, if the threshold level in the funds keeper is $1000 and the funds consumption for this meter is $500 per hour, then the remaining funds will be exhausted in approximately 2 hours. However, if the beginning of the next idle period is only 20 minutes away, it is not necessary to make a refill request immediately. The request can be made when the next idle period is over.

Moreover, it is advantageous to provide a device 170 for presenting a visual or audio message to the operator when an idle period is approaching, so as to allow the operator to determine whether to override the date-based rules set forth in the calendar 144. The operator may use the user interface 110 to inform the postage meter how to proceed with the forthcoming fund request. For example, the device 170 can be a display having a color bar to show the remaining funds in the funds keeper in relation to the predetermined level. The color in the color bar can change to reflect the remaining funds taken in consideration the funds consumption rate, for example. The device 170 may be able to send alarms in the form of emails, pagers and faxes to a person in charge.

Figure 3:
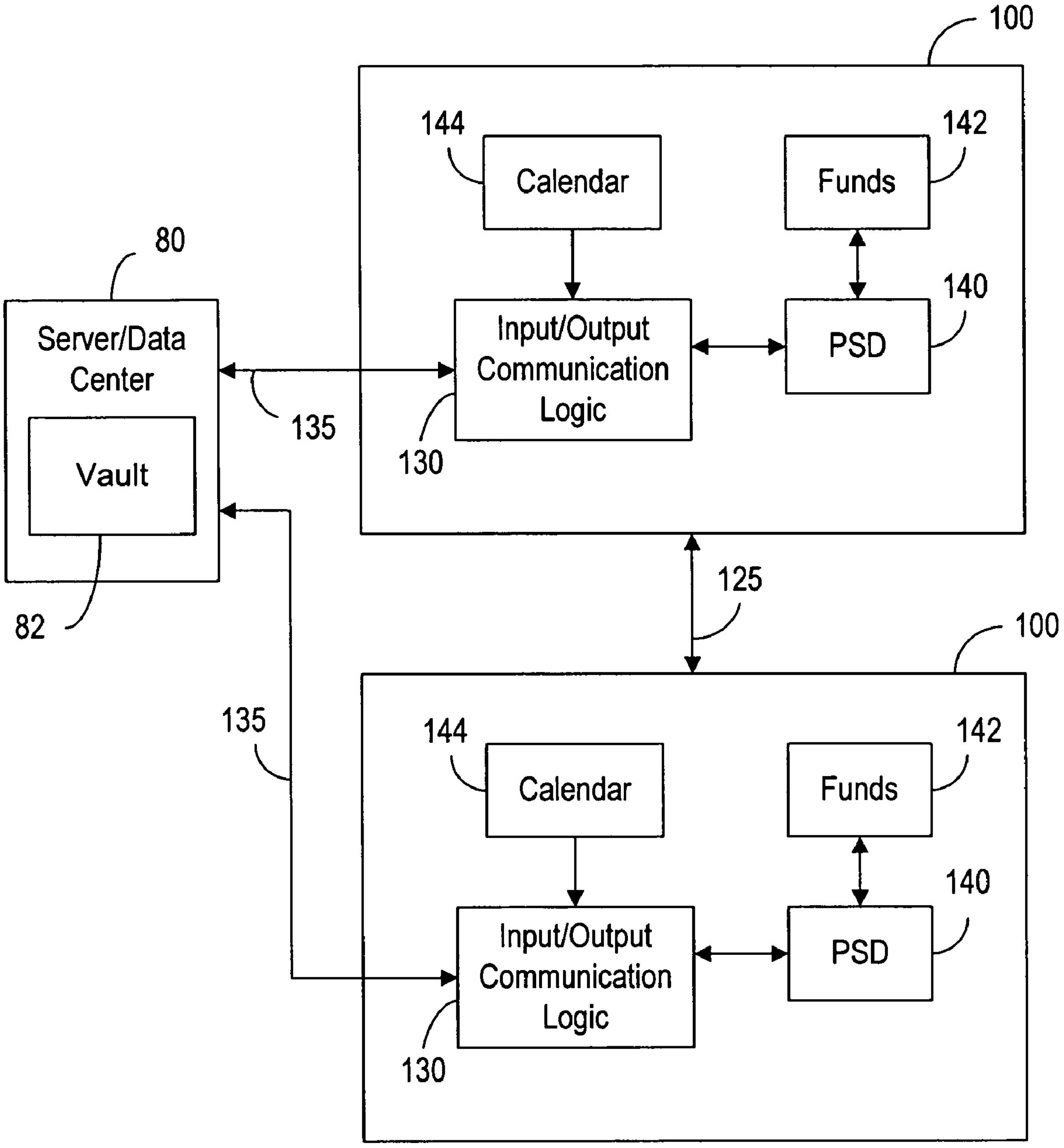
FIG. 3 is a block diagram showing two postage meters operatively connected to the Data Center for transferring funds therefrom.

When a mail production facility has two or more postage meters 100, each of the postage meters 100 can be linked with the Data Center 80, as shown in FIG. 3, so that it can make its own refill request. When more than one meters is used in same facility, it is possible that one postage meter uses more funds than the others. Thus, it is possible to link up these postage meters such that before one meter makes a refill request to the Data Center, especially when an idle period is approaching, it checks to see whether the other meters have extra funds to share. For example, the funds level in one meter is low but that meter still has to print indicia for a few more hours before a weekend. It would be advantageous to make use of the "extra" funds in other meters if sufficient funds are available among the postage meters within the facility. The inter-meter funds transfer and funds transfer request are indicated by a two-way arrow 125.

Figure 4:
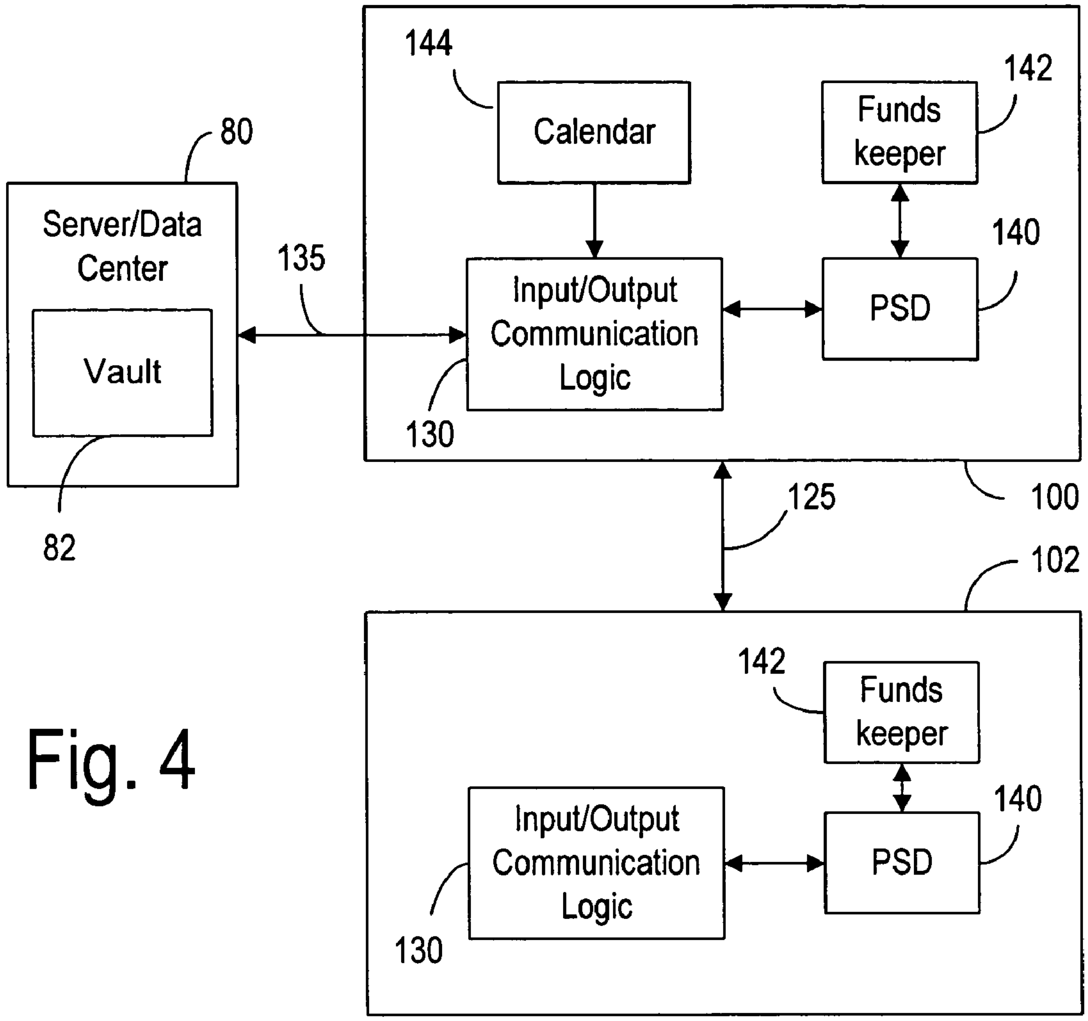
FIG. 4 is a block diagram showing two postage meters operatively connected to the Data Center for transferring funds therefrom through one of the meters.

Alternatively, one of the postage meters in the facility is designated as a master meter, which is responsible for making a funds transfer request to the Data Center. As shown in FIG. 4, the postage meter 100 is the master meter. Funds transfer and refill requests 135 between the Data Center and the meters 100, 102 are made through the master meter 100. As such, it is not necessary to have a separate calendar 144 in the postage meter 102. Whether the request for refill made by the postage meter 102 is granted is determined by the date-based rules set forth in the calendar 144 in the master postage meter 100.

Figure 5:
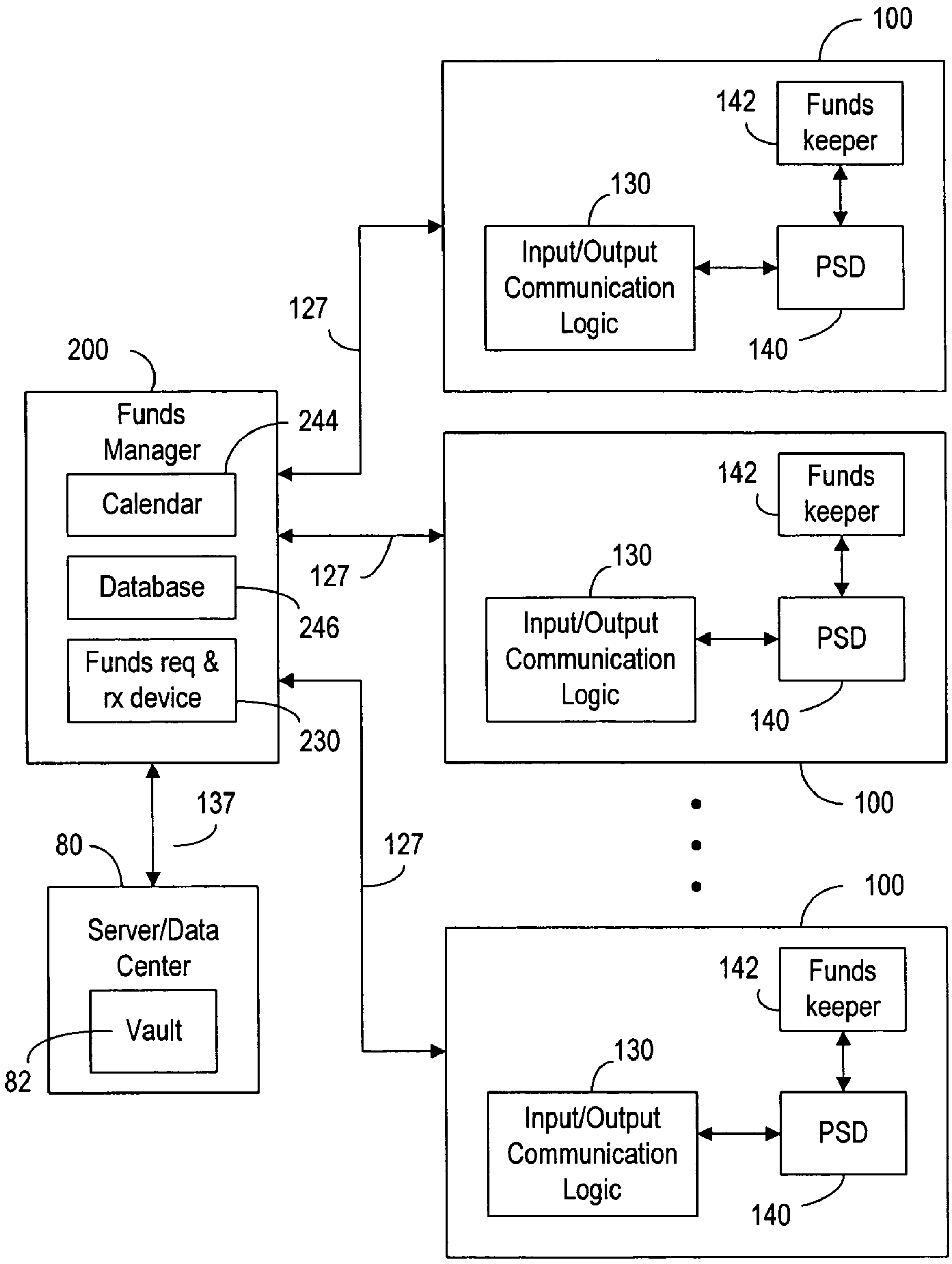
FIG. 5 is a block diagram showing a plurality of postage meters operatively connected to the Data Center for transferring funds therefrom through a fund manager.

In a very large mail product facility where hundreds of thousands of mail pieces are processed or produced daily, there may be tens or hundreds of postage meters being used simultaneously. It is advantageous to have a central funds manager device 200 to oversee the operations of all the meters 100, as shown in FIG. 5. Each of the meters 100 is required to make a refill request through the central funds manager device. As shown, the central funds manage device 200 has a scheduler or calendar 244 to control the postage meter funds transfer from the Data Center 80. Based on the date-based rules, and the estimated funds consumption of each meter until the beginning of the next idle period, the central funds manager device determines whether a funds transfer request is allowed.

Alternatively, the central funds manager device 200 collects meter information and stores the information in a database 246. The meter information may include the remaining funds in the funds keeper and the funds consumption in each of the meters 100. By monitoring the need in each of the meters, the central funds manager device distributes available funds among the meters. Only when the remaining funds in the meters collectively drop below a certain threshold level does the central funds manager device make a funds transfer request to the Data Center through a funds requesting and receiving mechanism 230, so that the meters can be refilled. The funds transfer and funds transfer request between the funds requesting and receiving mechanism and the Data Center are indicated by a two-way arrow 137.

Figure 6:
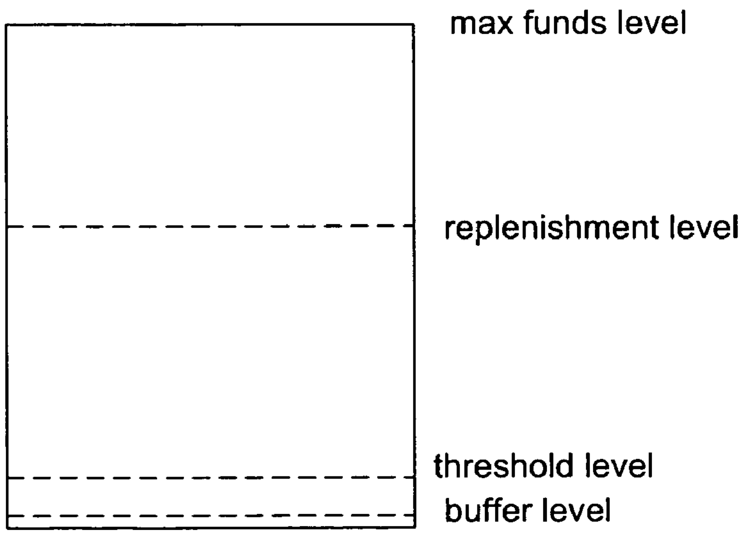
FIG. 6 is a schematic representation illustrating the relation among the maximum funds amount in a postage meter, a replenishment amount and a threshold amount.

It should be noted that, although each of the meters can be configured to receive a maximum funds amount to be stored in its funds keeper, the central funds manager device may replenish the meters up to a replenishment amount far less than the maximum funds amount. The replenishment level is computed based on the funds consumption of the postage meters such that only a reasonable amount of funds is deposited in the funds keeper. The replenishment level is illustrated in FIG. 6. As shown in FIG. 6, the threshold level is set at 10 percent of the maximum funds amount and the replenishment level is 60 percent so that the meter can use up to 50 percent of the maximum funds amount before the funds drop below the threshold level. Depending on the funds consumption rate of the meter and how close the next idle period will begin, the meter is allowed to use part of the remaining funds below the threshold value, leaving a certain amount in the funds keeper as buffer.

As shown in FIG. 5, the central funds manager device has a messaging device 270 to alert the operator when the funds level drops below the threshold level. The operator can override the date-based rules if necessary.

In a large operation, the stored postal funds can be significant. When such funds are locked up in a postage account fund, the locked up funds cannot be earning interest, or be used for other purposes, to the benefit of the production facility owner. Thus, the need for this novel feature may be felt more in a large mail production facility than in a small-scale mailing machine.

Figure 7:
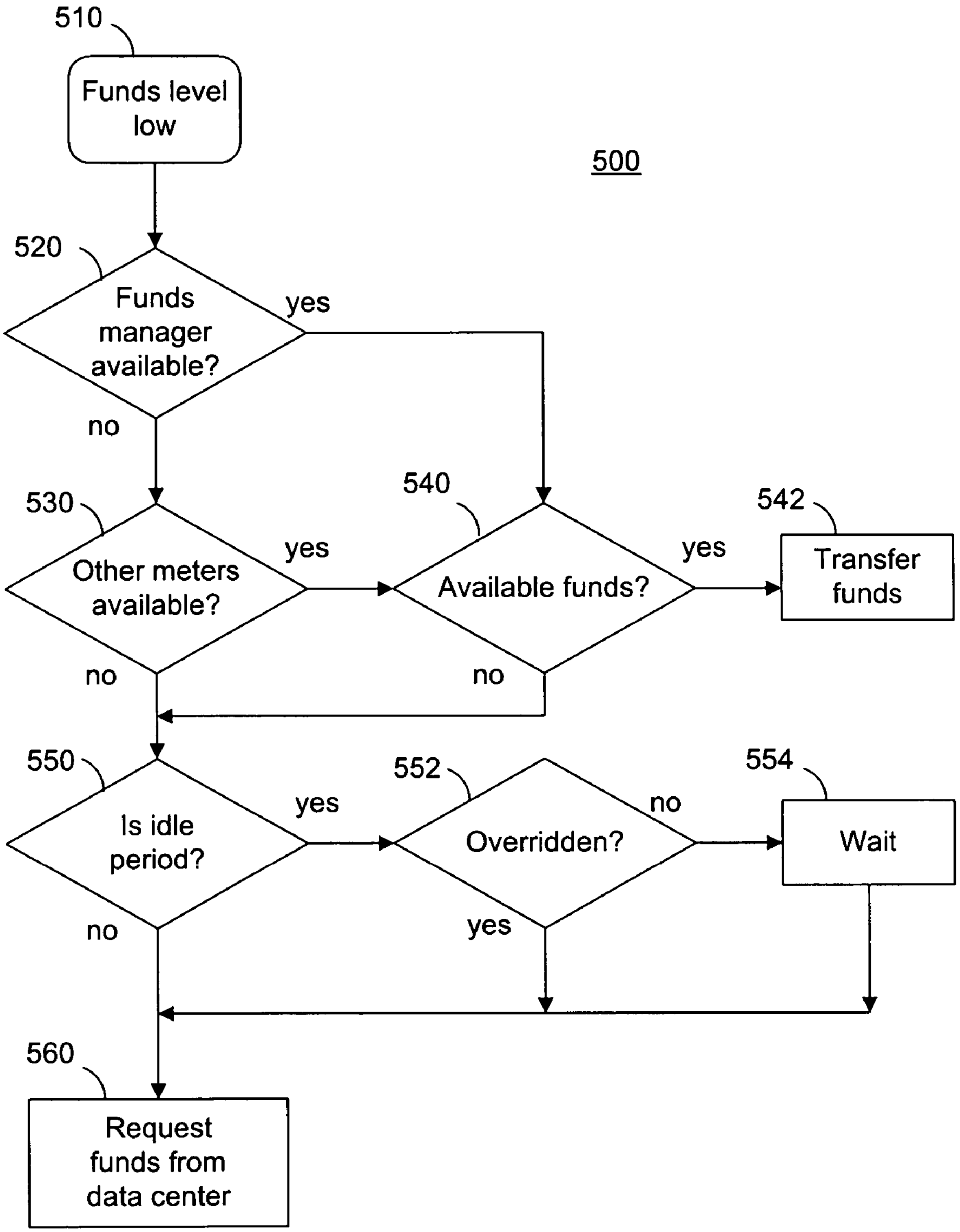
FIG. 7 is a flowchart illustrating the funds transferring method, according to the present invention.

In sum, the present invention uses a scheduler to control the fund transfer from a Data Center to one or more postage meters in a mail product facility, based on a date-based rule. The control can reduce the chance that unused funds sit idly in the postage meters, thereby losing the time-value of money. One embodiment of a method for meter refilling based on a date-based rule is illustrated in the flowchart 500, as shown in FIG. 7. As shown in FIG. 7, when the fund level in a postage meter drops below a threshold value (step 510), it requests a fund refill. If the meter is linked up to a central funds manager device (determined at step 520), the fund refill request is made through the central funds manager device as described in conjunction with FIG. 5. If the funds manager device determines (at step 540) that there are sufficient funds to be distributed among the meters, it transfers the funds as requested (step 542). When the collective funds level is low, the fund manager may make a funds transfer request (step 560) to the Data Center based on the date-based rules (step 550). However, the date-based rules can be overridden (step 552) by the operator. If the rules are not overridden, the request is withheld until the idle period is substantially over (step 554). If the meter is not linked up to a central funds manager device in the facility, the fund refill request can be made through another postage meter (530) as described in conjunction with FIGS. 3 and 4. The other meter can function like a funds manager.

It should be noted that, the postage meters 100, 102 as shown in FIGS. 2-5 are for illustrative purposes only. The postage meters can have a variety of embodiments. However, the date-based rules set forth in a scheduler in order to control funds transfer and funds transfer request according to the present invention, are applicable in many postage meters.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method of controlling postage meter funds transfer to a postage meter funds storage location in a postage meter, comprising the steps of:

determining if a level of funds in the postage meter funds storage location is below a predetermined amount;

determining, by a scheduling device, when a next idle period will begin based on date-based rules;

determining, by the scheduling device, a period of time until the next idle period;

if the period of time until the next idle period is greater than a predetermined length, as indicated in the date-based rules, then automatically requesting a transfer of funds to the postage meter funds storage location in the postage meter; and if the period of time until the next idle period is less than the predetermined length, as indicated in the date-based rules, then delaying automatically requesting the transfer of funds to the postage meter funds storage location in the postage meter until after the idle period.

2. The method of claim 1 further comprising the steps of:

determining an anticipated funds consumption of the postage meter for said period of time; and automatically requesting the transfer of funds if the level of funds is insufficient to meet the anticipated funds consumption, regardless of whether the predetermined time is less than the predetermined length.

3. The method of claim 1, wherein the postage meter funds storage location is located in the postage meter and the date-based rules are located in a separate device operatively connected to the postage meter, and wherein said requesting of the transfer of funds is carried out automatically by the postage meter when the funds level in the postage meter funds storage location is below the predetermined amount, and whether said requesting is carried out before the beginning of the next idle period or after the end of said next idle period is determined by the separate device based on the date-based rules.

4. The method of claim 3, wherein the separate device is another postage meter.

5. The method of claim 4, wherein the separate device is a funds manager and the postage meter is one of a plurality of meters controlled by the funds manager.

6. The method of claim 1, wherein the postage meter is operatively connected to a further postage meter having a further postage meter funds storage location, and the further postage meter funds storage location may have funds that can be shared with the postage meter, and wherein said requesting by the postage meter of the transfer of funds from the further postage meter before the beginning of the next idle period or after the end of said next period is also determined by whether the further postage meter funds storage location has sufficient funds also to meet the determined funds consumption of the postage meter.

7. The method of claim 2, wherein the postage meter is one of a plurality of meters operatively connected to a funds manager device, and a funds storage location is under the control of the funds manager device so that funds in the funds storage location can be shared among said plurality of meters, and wherein said requesting by the postage meter of the transfer of funds before the beginning of the next idle period or after the end of said next period is also determined by whether the funds storage location has sufficient funds also to meet the anticipated funds consumption of the postage meter.

8. A postage meter comprising:

a funds storage location for storing funds for funds consumption of the postage meter;

a scheduling device for setting date-based rules defining a plurality of idle periods;

a mechanism for determining:

if a level of funds in the funds storage location is below a predetermined amount;

a period of time between the time the level of funds is below the predetermined amount and a beginning of a next idle period based on the date-based rules; and a funds requesting module in the postage meter whereby, if the period of time until the next idle period is greater than a predetermined length, as indicated in the date-based rules, the funds requesting module is configured to automatically request a transfer of funds to the postage meter funds storage location; and if the period of time until the next idle period is less than the predetermined length, as indicated in the date-based rules, then the funds requesting module is configured to delay requesting the transfer of funds to the postage meter funds storage location until after the idle period.

9. The postage meter of claim 8 wherein the funds requesting module further is configured to determine an anticipated funds consumption of the postage meter for said period of time; and the funds requesting module is configured to automatically initiate the automatic fund transfer if the level of funds is insufficient to meet the anticipated funds consumption regardless of whether the predetermined time is less than the predetermined length.

10. The postage meter of claim 9, wherein the postage meter is configured for receiving funds from a separate device, and wherein the funds requesting module is configured to request funds from the separate device only if the separate device has sufficient funds also to meet the anticipated funds consumption of the postage meter.

11. The postage meter of claim 10, wherein the separate device comprises a further postage meter.

12. The postage meter of claim 10, wherein the separate device is a funds manager with funds that can be shared by one or more other postage meters.

13. The postage meter of claim 9, wherein the postage meter is configurable for manual funds refilling by an operator, said postage meter further comprising:

a device to provide a message indicative of the next idle period for indicating the next idle period during manual funds refilling.

14. The postage meter of claim 13, wherein the postage meter is also configurable for receiving an override command from the operator that said manual funds refilling is carried out despite the forthcoming of the next idle period.

15. A postal operations system comprising:

a central funds manager device operatively connected to a central funds location, and a plurality of postage meters operatively connected to the central funds manager device, wherein each of the postage meters comprises:

a funds storage location for storing funds for consumption by said postage meter;

a mechanism for determining if the level of funds in the funds storage location is below a predetermined amount; and a mechanism for requesting a transfer of funds for replenishing the funds in the funds storage location, and wherein the central funds manager device comprises:

a scheduler for setting date-based rules, defining a plurality of idle periods;

a mechanism for determining the period of time between the time the level of funds is below the predetermined amount at the requesting postage meter and the beginning of the next idle period based on the date-based rules, and predicted funds consumption by the requesting postage meter for said period of time; and a mechanism for requesting a transfer of funds from a funds central location before the beginning of the next idle period if an amount of funds based on said predetermined amount is insufficient to meet the determined predicted funds consumption, otherwise requesting said transfer of funds after the end of said next idle period so as to replenish the funds in the funds storage location of the requesting postage meter.

* * * * *